Sept. 20, 1960     K. G. COOK     2,953,705
HYDROGEN FILLED THERMIONIC VALVE
Filed Feb. 18, 1959
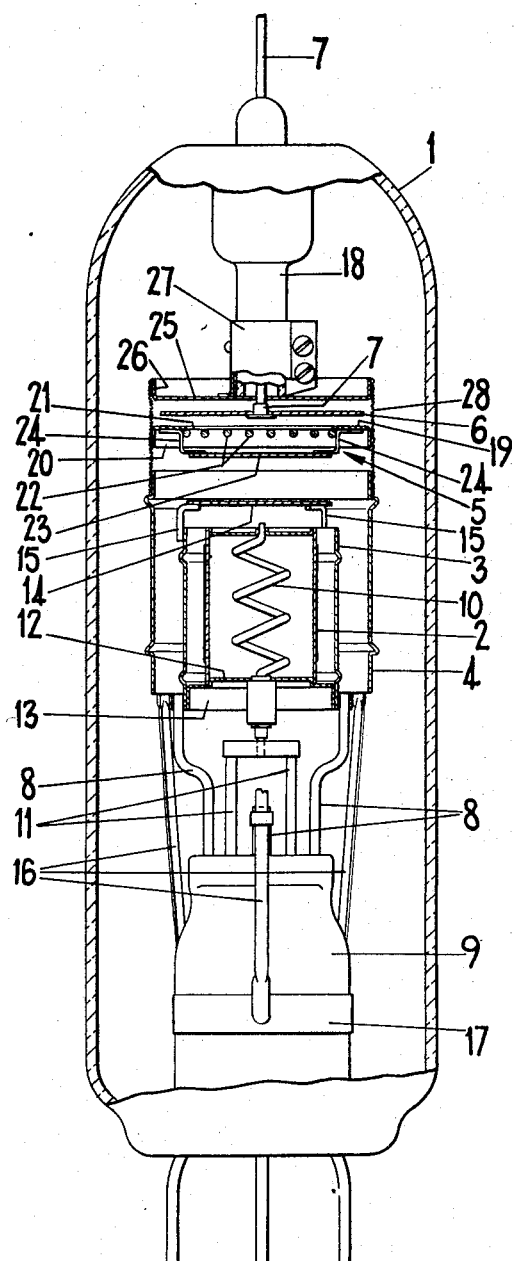
INVENTOR
KENNETH GEORGE COOK
BY
ATTORNEYS

United States Patent Office 2,953,705
Patented Sept. 20, 1960

---

2,953,705

HYDROGEN FILLED THERMIONIC VALVE

Kenneth George Cook, Northwood, England, assignor to The M-O Valve Company Limited, London, England Filed Feb. 18, 1959, Ser. No. 794,045

Claims priority, application Great Britain Mar. 13, 1958

3 Claims. (Cl. 313—186)

This invention relates to hydrogen filled thermionic valves. By a hydrogen filled thermionic valve is meant a gas filled thermionic valve in which the primary constituent of the filling, as regards the properties of the electrical discharge which occurs in the valve during operation, is hydrogen.

The invention is concerned particularly with hydrogen filled thermionic valves of the kind in which the filling is at a total pressure of between 100 and 1000 microns of mercury and in which, due to the presence of one or more obstacles, e.g. a control grid or baffle, between an anode and a cathode in the valve, the volt drop which occurs between the anode and the cathode when an electric discharge is passing between these two electrodes is appreciably greater than if no obstacles were present.

According to the invention, in a hydrogen filled thermionic valve of the kind specified at least 10% of the total pressure is due to the presence of deuterium. Preferably at least 50% of the total pressure is due to the presence of deuterium.

In a valve in accordance with the invention the volt drop occurring in operation between an anode and a cathode in the valve when an electric discharge is passing between them is appreciably lower than if the filling were natural hydrogen under similar conditions, but at the same time the advantages of a natural hydrogen filling, e.g. ease of replenishment, are retained.

It is thought that this decrease in volt drop is due to the fact that ions of deuterium are of greater mass than natural hydrogen ions and therefore diffuse to the electrode surfaces in the valve more slowly than natural hydrogen ions.

One arrangement in accordance with the invention will now be described by way of example with reference to the accompanying drawing which is a sectional view of a medium power hydrogen thyratron.

The thyratron has a sealed glass envelope 1 in which is mounted an electrode structure including a thermionic cathode 2 partially surrounded by a heat shield 3, a screening electrode 4, a control electrode 5 and an anode 6, the anode 6 being provided with a lead 7 sealed through one end of the glass envelope 1 and the other electrodes 2, 3, 4 and 5 being provided with leads 8 sealed through a pinch 9 at the other end of the envelope 1.

The cathode 2 is in the form of a hollow circular nickel cylinder of length 3.15 centimetres and internal diameter 2.23 centimetres. Coaxially within the cathode 2 is mounted a spiral heater 10 one end of which is connected to the end of the cathode 2 nearer the anode 6 and the other end of which is connected to two separate leads 11 sealed through the pinch 9. The major portion of the external curved surface of the cathode 2 is coated with a suitable emissive material.

To the end of the cathode 2 remote from the anode 6 there is fixed a nickel disc 12 of diameter 3.135 centimetres, the axis of the cathode 2 passing perpendicularly through the centre of the disc 12 and the disc 12 having around its circumference a flange 13 of width 0.475 centimetre extending away from the cathode 2 in the direction of its axis.

The heat shield 3 is in the form of a molybdenum tube of internal diameter 3.135 centrimetres and length 3.7 centrimetres and is welded to the flange 13 so as to be disposed coaxially around the cathode 2 with its end nearest the anode 6 substantially in the same plane as the corresponding end of the cathode 2. A molybdenum disc 14 of 2.9 centrimetres diameter which serves as a cathode baffle is attached to the heat shield 3 by means of three rightangled brackets 15 so as to be held 0.475 centimetre from the end of the cathode 2 nearer the anode 6, the axis of the cathode 2 passing perpendicularly through the centre of this disc 14.

The screening electrode 4 consists of a nickel tube of length 4.40 centimetres and external diameter 4.45 centimetres, the tube being mounted by means of three rods 16 extending from a clip 17 secured to the pinch 9 so as to be disposed coaxially around the heat shield 3 with its end nearer the anode 6 lying slightly closer to the anode 6 than the cathode baffle.

The anode 6 consists of a molybdenum disc 4.128 centimetres in diameter disposed perpendicular to the axis of the cathode 2. To the centre of the anode 6 is welded the anode lead 7 which is sheathed over the major portion of its length by a coaxial cylindrical glass sheath 18, the sheath 18 uniting with the envelope 1 in the region where the anode lead 7 is sealed through the envelope 1.

Surrounding the anode 6 is the control electrode 5 which is in the form of a substantially circular cylindrical box of internal diameter 4.45 centimetres and internal length 0.575 centimetre, the axis of the box passing perpendicularly through the centre of the anode 6 and the ends of the box being disposed parallel to the anode 6 at a distance of 0.275 centimetre from it.

The end of the box nearer the cathode 2 comprises a nickel disc 19 at the circumference of which is formed a flange 20 of width 0.40 centimetre extending away from the anode 6 perpendicularly to the plane of the disc 19. At the centre of the disc 19 there is a hole 21 of diameter 2.975 centimetres and to the side of the disc 19 nearer the cathode 2 there are welded a number of rods 22 of diameter 0.20 centimetre, these rods 22 being disposed parallel to one another across the hole 21 in the disc 19 and being separated by gaps of width 0.225 centimetre so as to form a grill across the hole 21. The grill is substantially completely screened from the cathode 2 by a flat circular molybdenum baffle plate 23 of diameter 3.175 centimetres fixed parallel to and at a distance of 0.475 centimetre from the end of the box nearer the cathode 2 by means of two rightangled brackets 24.

The end of the box remote from the cathode 2 comprises a nickel disc 25 having a small hole at its centre through which the anode lead 7 passes. At the edge of this disc 25 there is formed a flange 26 of width 0.40 centimetre extending away from the anode 6 perpendicularly to the plane of the disc 25, and to the side of this disc 25 remote from the anode 6 is connected a clip 27 whereby the box may be secured to the glass sheath 18 surrounding the anode lead 7.

The walls 28 of the box are formed from a strip of nickel mesh bent around and welded to the flanges 20 and 26. The width of the strip is such that the mesh extends beyond the end of the box nearest the cathode 2 so as to surround the end of the screening electrode 4 to which it is welded.

The interior of the envelope 1 is filled with deuterium at a pressure of 350 microns of mercury.

In a valve of the kind described above, with the control electrode 5 at the same potential as the cathode 2, a volt drop of 50 volts was found to occur between the anode 6 and the cathode 2 when the valve was passing a current of 0.5 amp. In a valve substantially identical with the one described above but having a filling of natural hydrogen at a pressure of 350 microns of mercury, a volt drop of 65 volts was found to occur between the anode and cathode when the valve was passing 0.5 amp.

In other valves in accordance with the invention the filling may only partly comprise deuterium, but the percentage reduction in volt drop over an identical valve whose filling comprises natural hydrogen in place of the deuterium decreases as the percentage of the total pressure in a value due to the presence of deuterium decreases.

I claim:

1. A hydrogen filled thermionic valve including an anode and a cathode and at least one obstacle between the anode and cathode whose presence causes the volt drop which occurs between the anode and cathode when an electric discharge is passing between them to be appreciably greater than if no obstacles were present, the filling being at a total pressure of between 100 and 1000 microns of mercury and at least 10% of the total pressure being due to the presence of deuterium.

2. A hydrogen filled thermionic valve according to claim 1 wherein at least 50% of the total pressure is due to the presence of deuterium.

3. A hydrogen filled thermionic valve according to claim 2 wherein the filling consists substantially entirely of deuterium.

References Cited in the file of this patent

UNITED STATES PATENTS

| | | |
|---|---|---|
| 2,518,879 | Germeshausen | Aug. 15, 1950 |
| 2,777,086 | Lederer | Jan. 8, 1957 |